United States Patent

[11] 3,573,487

[72] Inventor Robert W. Polkinghorn
Huntington Beach, Calif.
[21] Appl. No. 804,543
[22] Filed Mar. 5, 1969
[45] Patented Apr. 6, 1971
[73] Assignee North American Rockwell Corporation

[54] HIGH SPEED MULTIPHASE GATE

2 Claims, 3 Drawing Figs.

[52] U.S. Cl. .......... 307/205, 307/251
[51] Int. Cl. .......... H03k 19/08
[50] Field of Search .......... 307/205, 215, 218

[56] References Cited

UNITED STATES PATENTS

| | | | |
|---|---|---|---|
| 3,518,451 | 6/1970 | Booher | 307/251X |
| 3,526,783 | 9/1970 | Booher | 307/205 |
| 3,430,071 | 2/1969 | Sheng | 307/218X |
| 3,483,400 | 12/1969 | Washizuka et al. | 307/279 |
| 3,497,715 | 2/1970 | Yen | 307/205 |
| 3,510,679 | 5/1970 | Peil | 307/218X |

*Primary Examiner*—John S. Heyman
*Attorneys*—William R. Lane, L. Lee Humphries and Robert G. Rogers ABSTRACT: Buffering devices of a multiphase gate are connected either in series or parallel with individual logic functions implementing a composite multiple phase gate for either ANDing or ORing the functions at the output of the multiphase gate so that the number of gates in each function is relatively small. As a result of reducing the number of gates in each logic function, the multiphase gate can be operated at a higher clock frequency.

INVENTOR.
ROBERT W. POLKINGHORN
BY Robert G. Rogers
ATTORNEY

Patented April 6, 1971

3,573,487

2 Sheets-Sheet 2

INVENTOR.
ROBERT W. POLKINGHORN
BY Robert G. Rogers
ATTORNEY

HIGH SPEED MULTIPHASE GATE

BACKGROUND OF THE INVENTION

1. Field of the Invention

This invention relates to a high-speed multiphase gate and more specifically to a gate comprising a plurality of logic functions interconnected by buffer gates and wherein the gate has a higher speed by reducing the number of gating devices in each logic function.

2. Description of Prior Art

Ordinarily, logic circuits of a computer system must be capable of operating at a certain minimum clock rate. For example, it may be required to operate a multiphase gate using field effect devices at a 1 Mhz. clock rate. As a result of the speed limitations, care is required not to implement a logic function with a large number of gating devices. If the number of gating devices of a single function is too large, the inherent capacitance increases and the switching time of the function is reduced. As a result, the logic function may be incapable of operating at the required clock rate.

Although several methods may be used to prevent a reduction in speed, a preferred solution is one in which a logic function can be divided into individual functions and recombined at an output terminal to form the composite function. In that way, the individual functions can be gated at the required clock rate and the output of each of the individual functions can be combined without a reduction in speed. However, in order to be able to recombine the individual functions to implement a composite high-speed multiphase gate, some means must be provided between the devices and the output terminal of the multiphase gate. The present invention describes a high-speed multiphase gate implemented by individual logic functions which are recombined by the use of a buffering device at the output of each of the individual functions.

SUMMARY OF THE INVENTION

Briefly, the invention comprises a multiphase gate in which field effect devices implementing a logic function are divided into a plurality of logic functions, each including a reduced number of field effect devices. The individual functions are logically combined (OR'ed or AND'ed) through buffering devices between the outputs of each of the functions and a common output terminal for the multiphase gate. Since the number of devices for each function is reduced relative to the composite gate, the circuit can be clocked at a higher rate. The number of devices which can be used in an operable system depends on the frequency and other requirements imposed on a particular multiphase gate.

Therefore, it is an object of this invention to provide a high-speed multiphase gate.

It is another object of this invention to provide a multiphase gate in which the logic function implemented by the multiphase gate is divided into a plurality of individual logic functions, each combined at the output of the multiphase gate through buffering devices.

It is still another object of this invention to provide a logic function divided into a plurality of functions, each having a reduced number of gates and to combine the outputs of the functions through buffering devices to provide high-speed multiphase gate.

A still further object of this invention is to use buffering devices to logically combine NAND gate logic functions having a limited number of NAND'ed terms for producing a high-speed multiphase gate.

Still a further object of the invention is to divide a logic function comprising a relatively large number of gates into individual logic functions having a reduced number of gates and to OR the outputs of the function to produce a relatively high-speed gate.

Still a further object of the invention is to divide a logic function comprising a relatively large number of gates into individual logic functions having a reduced number of gates and to AND the outputs of the function to produce a relatively high-speed gate.

These and other objects of this invention will become more apparent when taken in connection with the description of the drawings, a brief description of which follows:

DESCRIPTION OF PREFERRED EMBODIMENTS

Figure 1:
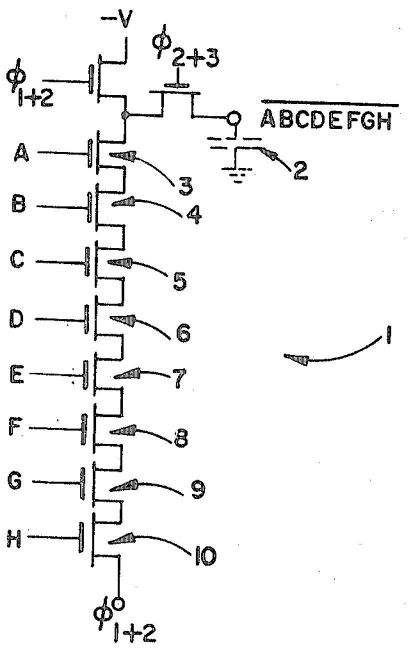
FIG. 1 illustrates one embodiment of a prior art NAND gate function which has a relatively slow clocking rate.

FIG. 1 is a schematic illustration of multiphase NAND gate 1 having eight inputs A through H. When all the inputs are true (negative) during $\phi_3$ time, the output of capacitor 2 is discharged through the series resistance of the eight MOS devices 3 through 10. As a result, a relatively long period is required to discharge the capacitor.

Although the clocking rate of the gate 1 could be increased by enlarging the size of the logic devices, such a solution may be impractical. It should be understood that although a series of only eight devices implementing a NAND logic function are illustrated, different logic functions with a different number of devices could have been used to illustrate a relatively slow-speed multiphase gate.

It should also be pointed out that although P-channel field effect devices are described and shown in connection with the preferred embodiment, N channel devices may also be used. Similarly, although MOS devices are used to describe the preferred embodiment, MNS, MNOS, and other enhancement mode field effect devices may also be used.

Figure 2:
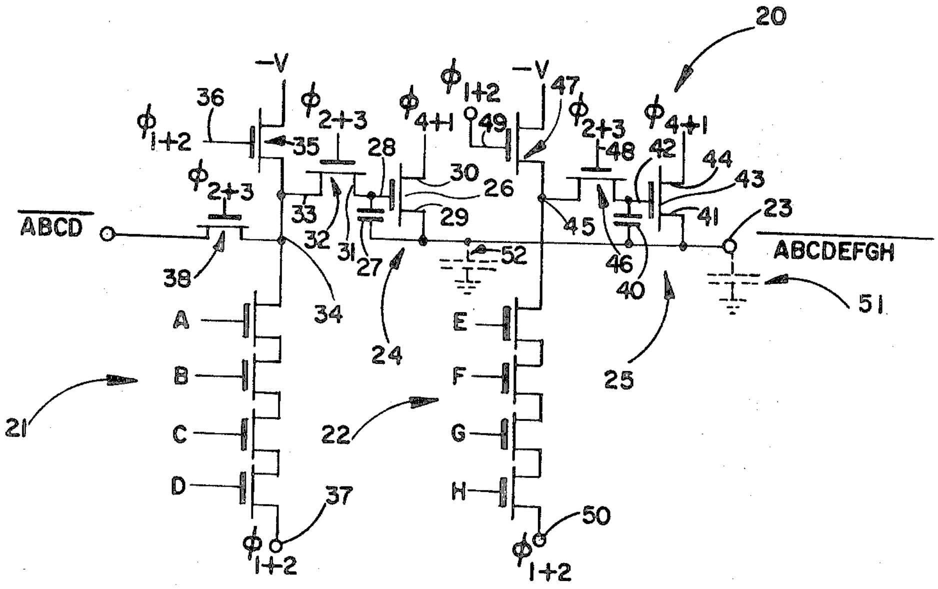
FIG. 2 illustrates one embodiment of a high-speed multiphase gate which overcomes the limitations of the FIG. 1 system.

FIG. 2 illustrates one embodiment of four-phase gating system 20 which can be clocked at a relatively higher rate than the FIG. 1 embodiment. NAND gates comprising a composite logic function, for example, as shown in FIG. 1 are divided into individual NAND functions 21 and 22 implementing logic functions $\overline{ABCD}$ and $\overline{EFGH}$, respectively.

The outputs from the individual NAND functions 21 and 22 are OR'ed together at the output terminal 23 of the multiphase gate 20 to produce the composite NAND logic function $\overline{ABCDEFGH}$. The output is the same as that shown for the relatively slower speed multiphase gate shown in FIG. 1, without sacrificing the low power, high packing density characteristics of a multiphase logic.

The individual NAND functions 21 and 22 are OR'ed together by buffering gates 24 and 25. Buffering gate 24 comprises MOS device 26 having capacitor 27 connected between its control electrode 28 and its output electrode 29 for feeding back the output electrode voltage to the control electrode. Such an arrangement is often referred to as a "bootstrapped" connection. The other electrode 30 is connected to receive clock signal $\phi_{i+1}$.

Figure 3:
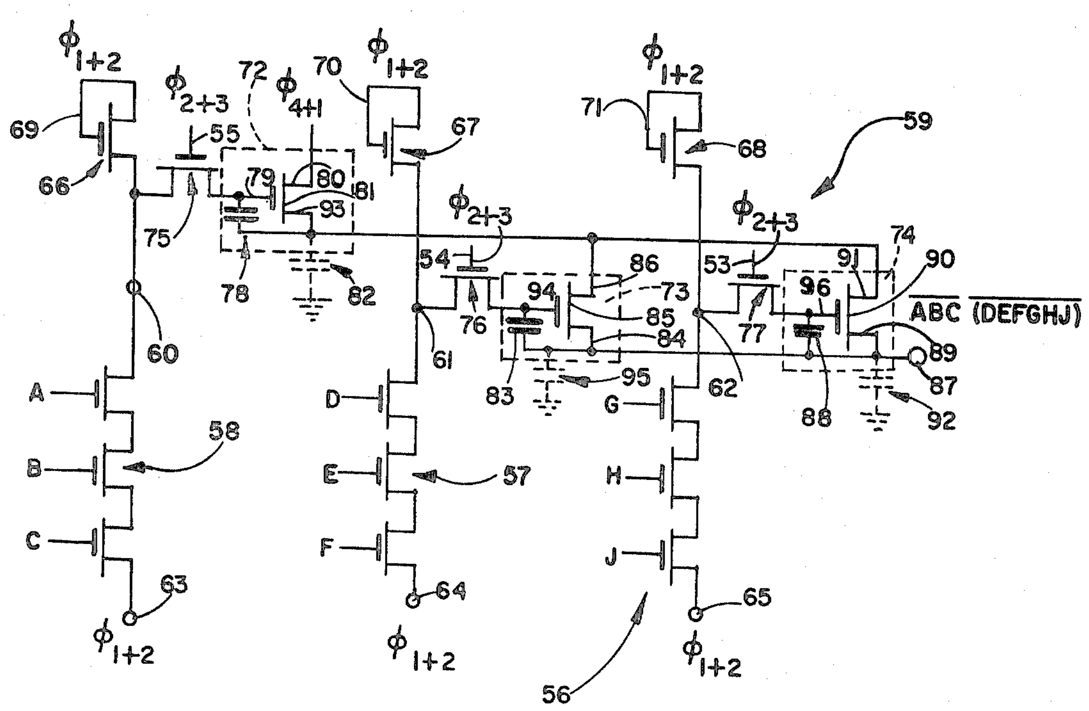
FIG. 3 illustrates a second embodiment of a high-speed multiphase gate which also overcomes the limitations of the FIG. 1 system.

Buffering gates shown in FIGS. 2 and 3 are described in detail in the patent application entitled "Isolation Circuit for Gating Devices" filed Jan. 7, 1969, Ser. No. 789,441 by Robert W. Polkinghorn et al. In that application, the buffering gate is described as being comprised of a feedback capacitor connected between the output electrode and the control electrode of a MOS device having a clock signal on its other electrode. The capacitor is charged and conditionally discharged so that the MOS device is turned on as a function of the initial voltage on the capacitor and the increased voltage from the output electrode fed back through the capacitor to the control electrode of the device. The output electrode is driven to approximately the voltage level of the clock source in response to the final capacitor voltage. As a result, and as one of the advantages of the buffering circuit, a low output impedance is provided. Other advantages and details are contained in the patent application.

Control electrode 28 is also connected to electrode 31 of MOS device 32 which has its other electrode 33 connected to output terminal 34 of the NAND function 21 and to voltage source $-V$ through MOS device 35. Control electrode 36 of MOS device 35 is connected to receive clock signal $\phi_{1+2}$. The other terminal 37 of the NAND function 21 is connected to receive clock signal $\phi_{1+2}$.

Output device 38 is provided to permit the output $(\overline{ABCD})$ of the NAND function 21 to be used independently of the output $(\overline{ABCDEFGH})$ of the multiphase gate 20. For example, the $\overline{ABCD}$ function may be used in a high-speed carry logic scheme.

Buffering gate 25 comprises capacitor 40 connected between output electrode 41 and control electrode 42 of MOS device 43 for feeding back voltage from the output electrode to the control electrodes as described for buffer gate 24. Electrode 44 of the device 43 is connected to receive clock signal $\phi_{4+1}$. Control electrode 42 is connected to output terminal 45 of the NAND function 22 $(\overline{EFGH})$ through MOS device 46 and to voltage source $-V$ through MOS devices 46 and 47. Control electrodes 48 and 49 of devices 46 and 47, respectively, are connected to receive clock signals $\phi_{3+3}$ and $\phi_{1+2}$, respectively. Terminal 50 of the NAND function 22 is connected to receive clock signal $\phi_{1+2}$.

In operation, during $\phi_2$ time, the inherent capacitance (not shown) of each of the logic functions 21 and 22 is precharged by applying approximately the voltage $-V$ to the terminals 34 and 45 of the functions. The voltage, approximately $-V$, is also applied to the control electrodes 28 and 42 of MOS devices 26 and 43 to drive the output electrodes 29 and 41 to the voltage potential of $\phi_{4+1}$ which is ground during $\phi_2$ time. In other words, the inherent capacitance 52 and 51 are discharged to ground. At the same time, capacitors 27 and 40 are charged to approximately $-V$.

During $\phi_3$ time, the logic state of the NAND functions 21 and 22 are evaluated and the capacitors 27 and 40 are conditionally discharged as a function of the logic states of the functions $(\overline{ABCD}$ and $\overline{EFGH})$. For example, if ABCD is true ($\overline{ABCD}$-false) capacitor 27 is discharged to ground. Capacitor 40 is discharged if $\overline{EFGH}$ is false.

If the logic functions $\overline{ABCD}$ and $\overline{EFGH}$ are true, capacitors 27 and 40 remain charged at the beginning of $\phi_{4+1}$ time and output terminal 23 is pulled, or driven, negative by the $\phi_{4+1}$ clock signal through buffering gates 24 and 25. The feedback of the output of the buffering gate to control electrodes 28 and 42 of MOS devices 26 and 43 through capacitors 27 and 40 allows the output terminal 23 to be driven to the value of the clock signal $\phi_{4+1}$. For the particular embodiment shown and described, it is assumed that the clock signal $\phi_{4+1}$ has a negative (true) voltage level at least one threshold more negative than the $-V$ voltage. The other clock signals have similar voltage levels during their true periods. During the false interval, the clock signals have voltage levels approximately equal to ground.

If the logic functions had been false (ground) at the beginning of $\phi_{4+1}$ time, then output terminal 23 would remain at ground. As indicated above, output terminal 23 only remains at ground if all the logic inputs A through H are true during the evaluation time.

The composite NAND logic function produced at output terminal 23 is the OR of the outputs appearing at terminals 34 and 45 $(\overline{ABCD}$ and $\overline{EFGH})$. By Boolean algebra, that output function can be shown to be $\overline{ABCDEFGH}$.

Although the FIG. 2 embodiment OR'ed the outputs of the individual gates by connecting each of the buffering gates in parallel between a common clock signal and a common output terminal, it is possible to AND the outputs of the individual functions by connecting the buffering gates in series with each other between a common output terminal and a clock signal. FIG. 3 is a schematic illustration of a composite AND function which is logically OR'ed with another function. Except for the position of the buffering gates and the number of gates of each individual logic function, the circuit elements are substantially the same as the elements shown in FIG. 2.

The multiphase gate 59 comprises individual NAND function 58 $(\overline{ABC})$ at output terminal 60, NAND function 57 $(\overline{DEF})$ at output terminal 61 and NAND function 56 $(\overline{GHJ})$ at output terminal 62. For the embodiment shown, the multiphase gate is a four phase ($\phi_1$, $\phi_2$, $\phi_3$, $\phi_4$). The other terminals 63, 64 and 65 of the individual NAND functions are connected to receive clock signal $\phi_{1+2}$. The output terminals are also connected to receive clock signal $\phi_{1+2}$ through MOS devices 66, 67 and 68, respectively, which also have their control electrodes 69, 70 and 71 connected to receive the clock signal $\phi_{1+2}$.

Output terminals 60, 61 and 62 are also connected to buffer gates 72, 73 and 74, respectively through MOS devices 75, 76 and 77, each having their control electrodes 55, 54 and 53 connected to receive clock signal $\phi_{2+3}$.

Buffer gate 72 comprises MOS device 81 having its control electrode 79 connected through MOS device 75 to terminal 60. Capacitor 78 is connected between the control electrode 79 and electrode 93 to implement a "bootstrap" connection as previously described. Electrode 80 is connected to receive clock signal $\phi_{4+1}$. Capacitor 82 is connected between electrode 80 and electrical ground, or some other reference potential.

Buffer gate 73 comprises MOS device 85 having its control electrode 94 connected through MOS device 76 to terminal 61. Capacitor 83 is connected between the control electrode 94 and electrode 84 to implement a bootstrap connection. Electrode 86 is connected to electrode 93 of MOS device 81. Capacitor 95 is connected between electrode 84 and electrical ground.

Buffer gate 74 comprises MOS device 90 having its control electrode 96 connected through MOS device 77 to terminal 62. Capacitor 88 is connected between control electrode 96 and electrode 89 to implement a bootstrap connection. Electrode 91 is connected to electrode 86 of MOS device 85 and to electrode 93 of MOS device 81. Capacitor 92 is connected between electrode 89 and ground. Output terminal 87 is connected to electrode 89.

The inherent capacitances of the MOS devices 81, 85 and 90 are represented by the capacitors 82, 95, and 92, shown by broken lines and previously described.

The OR'ed outputs appearing at terminals 61 and 62 are AND'ed with the output appearing at terminal 60 through the buffer gate 72. The outputs appearing at terminals 61 and 62 are OR'ed by buffer gates 73 and 74. In effect, buffer gate 72 is connected in series with the parallel connected buffer gates 73 and 74.

If the logic function 56 $(\overline{GHJ})$ is ignored, the function $\overline{ABC}{\cdot}\overline{DEF}$, also representable as $(\overline{ABC+DEF})$ will appear at the output terminal 87. However, when the $\overline{GHJ}$ logic function is included, the logic function at output terminal 87 becomes $\overline{ABC}\,(\overline{DEF+GHJ})$ which can also be represented as $\overline{ABC}\,(\overline{DEFGHJ})$ as shown in FIG. 3.

The operation of the FIG. 3 multiphase gate 59 is substantially the same as the operation of multiphase gate 20 shown in FIG. 2. During $\phi_1$ time, the inherent capacitance (not shown) of the logic functions $\overline{ABC}$, $\overline{DEF}$, $\overline{GHJ}$, is precharged.

During $\phi_2$ time, the output electrodes 93, 84 and 89 including capacitors 82, 95 and 92 are discharged to ground when devices 81, 85 and 90 are turned on. Capacitors 78, 83 and 88 are charged to approximately a threshold more positive than the clock signal $\phi_{1+2}$.

During $\phi_3$ time, the logic states of the NAND functions $\overline{ABC}$, $\overline{DEF}$, and $\overline{GHJ}$ are evaluated. If the inputs A through J are true, then the capacitors 78, 83 and 88 are discharged to the ground potential appearing at terminals 63, 64 and 65, respectively so that during $\phi_4$ time, common output terminal 87 is at ground.

If all inputs are false, however, the output terminal 87 is driven to a negative or true voltage potential approximately equal to the clock signal $\phi_{4+1}$.

If either the outputs at terminals 61 or 62 are true and the output at terminal 60 is true, the output at terminal 87 will be true.

It is pointed out that the logic function being AND'ed in FIG. 3 could have been implemented in the individual multiphase gate. The same is true for the OR functions shown in FIG. 2. However, by using the buffering gates, the logic need only be mechanized once instead of being duplicated in each gate. As a result, considerable area on the substrate (chip) in which the devices are formed can be saved. That is particularly true where a complex logic term is involved.

While the invention has been described with respect to several physical embodiments constructed in accordance therewith, it will be apparent to those skilled in the art that various modifications and improvements may be made without departing from the scope and spirit of the invention.

I claim:

1. A high-speed gate having an output terminal and using a multiphase clock cycle, said gate comprising:

a plurality of inverter stages each including a logic network having first and second terminals, said network being implemented by a plurality of field effect transistors connected between said two terminals, each of said inverter stages having an output;

an output field effect transistor driver for each of said inverter stages connected between said output terminal and a multiphase clock signal, the gate electrodes of the field effect transistor drivers connected to the outputs of the inverter stages, said output terminal being common to the field effect transistor drivers;

each inverter stage comprising a load field effect transistor connected between said first terminal of said logic network and a voltage source for becoming conductive during a first- and second-phase time of said multiphase clock cycle for providing a first voltage level to said first terminal of a logic network during said first-phase time, and an isolation field effect transistor connected between said first terminal and the gate electrode of the associated output field effect transistor driver for becoming conductive during a second- and third-phase time of said multiphase clock cycle for applying said first voltage level to said gate electrode during said second-phase time;

said second terminal of each of said logic networks being connected to a voltage source for providing a first voltage level during said first- and second-phase times and a second voltage level at least during said third-phase time whereby, if the logic function of said logic network is true during said third-phase time, the first voltage level applied to the gate electrode of said output field effect transistor driver during said second-phase time is changed to said second voltage level for rendering the associated output field effect transistor driver nonconductive at least during a fourth-phase time of said multiphase clock cycle, said recited multiphase clock signal providing a first voltage level at least during said fourth-phase time whereby said output is set to said first voltage level during said fourth-phase time if any one of the logic functions is false during said third-phase time.

2. A high-speed gate combining a plurality of logic functions at a common output terminal using a multiphase clock cycle, said gate comprising:

a plurality of inverter stages each including a logic network having first and second terminals, said logic network being implemented by a plurality of field effect transistors connected between said first and second terminals, each of said inverter stages having an output;

an output field effect transistor driver for each of said inverter stages with the driver for at least one inverter and the driver for at least one other inverter being connected in electrical series between a multiphase clock signal and said output terminal, the gate electrodes of said field effect transistor drivers connected to the outputs of their associated inverter stages;

each of said inverter stages comprising a load field effect transistor connected between a first terminal of the logic network for an inverter stage and a voltage source for providing a first voltage level to the first terminal of each logic network during a first-phase time of said multiphase clock signal and to the gate electrode of each output field effect transistor driver during a second-phase time of said multiphase clock cycle, and an isolation field effect transistor connected between said first terminal and the gate electrode of an associated driver for connecting said first voltage level to said gate electrode during said second-phase time of said multiphase clock cycle, said isolation field effect transistor remaining conductive during a third-phase of said multiphase clock cycle;

the second terminal of each logic network being connected to a clock signal for providing a first voltage level to said second terminals during said first- and second-phase time and for providing a second voltage level to said second terminals at least during said third-phase time whereby the gate electrodes of said drivers are connected to said second voltage level during said third-phase time if the logic functions of said logic networks are true whereby, said output field effect transistor drivers are rendered conductive if the voltage level on the gate electrodes remains set to said first voltage level during a fourth-phase time of said multiphase clock cycle and are rendered nonconductive if the voltage on said gate electrodes is changed to said second voltage level during said fourth-phase time.